United States Patent
Hannu et al.

(10) Patent No.: US 8,913,512 B2
(45) Date of Patent: Dec. 16, 2014

(54) TELECOMMUNICATION APPARATUS, METHOD, AND COMPUTER PROGRAM CONTROLLING SPORADIC DATA TRANSMISSIONS

(75) Inventors: Hans Hannu, Luleå (SE); Jan Christoffersson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 13/120,506

(22) PCT Filed: Oct. 16, 2008

(86) PCT No.: PCT/SE2008/051167
§ 371 (c)(1),
(2), (4) Date: Mar. 23, 2011

(87) PCT Pub. No.: WO2010/044713
PCT Pub. Date: Apr. 22, 2010

(65) Prior Publication Data
US 2011/0170541 A1    Jul. 14, 2011

(51) Int. Cl.
*G01R 31/08* (2006.01)
*G06F 11/00* (2006.01)
*H04J 1/16* (2006.01)
*H04L 1/00* (2006.01)
*G10L 21/00* (2013.01)
*G10L 25/93* (2013.01)
*H04W 28/06* (2009.01)
*H04W 52/02* (2009.01)

(52) U.S. Cl.
CPC .......... *H04W 28/06* (2013.01); *H04W 52/0216* (2013.01); *H04W 52/0238* (2013.01)
USPC ............................ 370/252; 370/229; 704/215

(58) Field of Classification Search
CPC ................ G10L 19/012; G10L 19/083; G10L 2021/02168; G10L 2025/783; G10L 25/78; G10L 19/005; G10L 19/07; G10L 2025/786; G10L 25/18
USPC .......... 370/389, 229, 252, 339, 412; 704/226, 704/210, 215
See application file for complete search history.

(56) References Cited

U.S. PATENT DOCUMENTS 5,812,965 A * 9/1998 Massaloux ..................... 704/205
6,347,081 B1 * 2/2002 Bruhn ........................... 370/337
(Continued)

FOREIGN PATENT DOCUMENTS

EP    1 715 712    10/2006
JP    50397393 A   11/1993
(Continued)

OTHER PUBLICATIONS

International Search Report for PCT/SE2008/051167, mailed Jul. 24, 2009.
Alcatel-Lucent: 3GPP Draft; GP-080153—GAN AMR DTX Clarification Options, (Feb. 13, 2008), 7 pages.
(Continued)

Primary Examiner — Hoang-Chuong Vu
(74) Attorney, Agent, or Firm — Nixon & Vanderhye, P.C.

(57) ABSTRACT

A telecommunication apparatus (100, 200) enabled for high-speed packet access is disclosed. The apparatus (100, 200) is arranged to operate according to a reduced and a further reduced mode of transmission of dedicated physical control channel transmission, and having a data transmission controller (102, 202) arranged to control sporadic data transmissions. The data transmission controller (102, 202) is arranged to determine if omission of a sporadic data transmission will significantly degrade performance, and if not, disable transmission of that data transmission. A method of controlling sporadic data transmissions for such an apparatus is also disclosed, as well as a computer program for implementing the method.

21 Claims, 2 Drawing Sheets

(56) References Cited

U.S. PATENT DOCUMENTS

| | | | |
|---|---|---|---|
| 6,658,064 B1* | 12/2003 | Rotola-Pukkila et al. | 375/295 |
| 7,664,646 B1* | 2/2010 | James et al. | 704/270.1 |
| 8,059,632 B2* | 11/2011 | Xu | 370/352 |
| 2004/0062274 A1* | 4/2004 | Hakansson et al. | 370/468 |
| 2005/0152341 A1 | 7/2005 | Curcio et al. | |
| 2006/0149536 A1* | 7/2006 | Li | 704/215 |
| 2006/0293885 A1* | 12/2006 | Gournay et al. | 704/223 |
| 2007/0268861 A1* | 11/2007 | Diachina et al. | 370/329 |
| 2007/0274338 A1* | 11/2007 | Sebire et al. | 370/466 |
| 2008/0027716 A1* | 1/2008 | Rajendran et al. | 704/210 |
| 2008/0137573 A1* | 6/2008 | Cave et al. | 370/310 |
| 2011/0044185 A1* | 2/2011 | Perraud et al. | 370/252 |

FOREIGN PATENT DOCUMENTS

| | | |
|---|---|---|
| JP | 2001-506470 A | 5/2001 |
| JP | 2008-546341 A | 12/2008 |
| WO | 99/05871 A3 | 2/1999 |
| WO | 2006050443 A1 | 5/2006 |
| WO | 2006/136901 A2 | 12/2006 |
| WO | WO 2008/115029 | 9/2008 |

OTHER PUBLICATIONS

International Preliminary Report on Patentability for PCT/SE2008/051167, dated Aug. 6, 2010.

Japanese Office Action mailed Jan. 8, 2013 in Japanese application 2011-532038.

* cited by examiner

TELECOMMUNICATION APPARATUS, METHOD, AND COMPUTER PROGRAM CONTROLLING SPORADIC DATA TRANSMISSIONS

This application is the U.S. national phase of International Application No. PCT/SE2008/051167, filed 16 Oct. 2008, the entire contents of which is hereby incorporated by reference.

TECHNICAL FIELD

The present invention relates, at least in part, to a telecommunication apparatus enabled for high-speed packet access, a method of controlling sporadic data transmissions for such an apparatus, and a computer program for implementing the method.

BACKGROUND

High-speed packet access features, like in Universal Mobile Telecommunication System (UMTS), provide for continuous connectivity. An approach for achieving this is User Equipment (UE) Discontinuous Transmission (DTX), which often is referred to as Uplink (UL) Dedicated Physical Control Channel (DPCCH) gating. With UL DPCCH gating, the power control signalling is sent only periodically (gated) to achieve a reduced mode of DPCCH transmissions. This can be made based on whether the UE have any data to send or not.

WO 2006/050443 A1 discloses an approach for selecting a 'normal activity mode' or a 'reduced activity mode', where the 'normal activity mode' means sending DPCCH transmissions in each slot, and 'reduced activity mode' means sending DPCCH transmissions, with full power, using e.g. only every fourth slot. The reduced activity mode can reduce interference up to a reduction corresponding to a 6 dB signal-to-interference target reduction. If the UE has not had any data to send for a certain time period, it switches to the reduced activity mode.

The gating scheme can have two different cycles with different cycle length, i.e. a reduced mode and a further reduced mode. For example, UMTS specifies having two such reduced modes. In the given example, after a data transmission on a Dedicated Physical Data Channel (DPDCH), the UE, which may have been in the further reduced operation mode, enters the reduced operation mode, i.e. the cycles between DPCCH transmissions are set to the shorter interval. After some time, preferably set by some timer or after a certain number of DPCCH transmissions, the UE returns to the further reduced operation mode, i.e. the cycles between DPCCH transmissions are set to the longer interval. The UE is kept in this further reduced operation mode until another DPDCH transmission occurs, and the similar process is repeated.

Typically, the further reduced operation mode is configured to have much less intense DPCCH activity. In this operation mode, it is also possible to use a longer preamble than what is available in the other reduced operation mode. This long preamble is supposed to be sufficient to allow power control to adjust before any DPDCH transmission. In case of the shorter interval, i.e. the more intense DPCCH activity, the shorter preamble will suffice.

The two reduced operation modes basically target different transmission scenarios, where the more intense DPCCH activity supports frequent data transmissions with short intervals, and the less intense DPCCH activity supports applications with sporadic or large data volumes. For applications with periodic transmissions, such as Voice over Internet Protocol (VoIP) with Adaptive Multi-Rate (AMR) coding type, the further reduced operation mode is beneficial to use as much as possible. In the given example, voice frames are encoded and transmitted every 20 ms, while Silence Insertion Descriptor (SID) frames are transmitted every 160 ms during silence periods. This implies that, during silence periods, the UE enters the intense DPCCH activity mode every 160 ms and sends a burst of DPCCH frames before it returns to the less activity mode until next SID frame transmission. Similar applies to other data transmission scenarios where sporadic "keep alive" transmissions are present, e.g. some client-server sessions. This not only increases interference; it also increases power consumption of the UE. It is therefore a desire to provide an improved approach for efficient gating.

SUMMARY

The present invention is based, at least in part, on the understanding that for applications with periodic data transmission, unnecessary DPCCH transmissions are made. The inventors have found that the two first SID frames of a silent period are important to give an acceptable background noise, while if a few of the proceeding SID frames are lacking, an acceptable background noise can still be achieved. By omitting a few of these SID frames, the unnecessary DPCCH transmissions are avoided, since the more intense reduced transmission mode of DPCCH transmissions is otherwise triggered by these SID frames. The similar approach is also found to be efficient for other data transmission scenarios where sporadic "keep alive" transmissions are present, e.g. some client-server sessions.

Thus, an aspect of the invention alleviates the above stated problem by omitting sporadic data transmissions where omission will not significantly degrade performance. Here, the term 'degrade performance' should be interpreted to concern proper operation of the transmitting telecommunication apparatus, its communication, or the receiving party. Thus, 'significantly degrade performance' is meant that any of these will not work as intended to, e.g. the communication is lost, or the sending telecommunication apparatus or the receiving party, or their applications, are unable to fulfill their operation.

According to a first aspect, there is provided a telecommunication apparatus enabled for high-speed packet access. The apparatus is arranged to operate according to a reduced and a further reduced mode of transmission of dedicated physical control channel transmission, and having a data transmission controller arranged to control sporadic data transmissions. The data transmission controller is arranged to determine if omission of a sporadic data transmission will significantly degrade performance, and if not, disable transmission of that data transmission.

The sporadic data transmissions may be silence insertion descriptor frames transmitted in a silence period of speech transmission, and wherein omission of a first and a second silence insertion descriptor frame of the same silence period may considered to significantly degrade performance, while omission of a first number of subsequent silence insertion descriptor frames may be considered not to degrade performance significantly. The first number may be 3 to 7, preferably 4 to 6, preferably 5.

Here, a second number of subsequent frames after the first number of omittable subsequent silence insertion descriptor frames within the same silence period may be considered to significantly degrade performance. The second number may be one, two, or three. Thus, after disabling of the first number of silence descriptor frames, one or a few silence descriptor frames may be transmitted to update background noise data. Also here, omission of a third number of subsequent frames after the second number of subsequent silence insertion descriptor frames within the same silence period may be considered not to degrade performance significantly. The third number may be 3 to 7, preferably 4 to 6, preferably 5. Thus, after transmission of the second number of silence descriptor frames, the transmission of a few or a third number of subsequent silence descriptor frames may be disabled.

The data transmission controller may be arranged to perform the omission of data transmissions at an application of the telecommunication apparatus at which application the data transmissions emanate. The application may be a speech encoder.

The data transmission controller may be arranged to perform the omission of data transmissions at a data traffic stack layer arranged for transfer of user data of the telecommunication apparatus. The data traffic stack layer may be Packet Data Convergence Protocol.

According to a second aspect, there is provided a method of controlling sporadic data transmissions for a telecommunication apparatus enabled for high-speed packet access, the apparatus being arranged to operate according to a reduced and a further reduced mode of transmission of dedicated physical control channel transmission. The method comprises determining if omission of a sporadic data transmission will significantly degrade performance, and if determined to not significantly degrade performance, disabling transmission of that data transmission.

The sporadic data transmissions may be silence insertion descriptor frames transmitted in a silence period of speech transmission. Omission of a first and a second silence insertion descriptor frame of the same silence period may be considered to significantly degrade performance, while omission of a first number of subsequent silence insertion descriptor frames may be considered not to degrade performance significantly. The first number may be 3 to 7, preferably 4 to 6, preferably 5.

Here, a second number of subsequent frames after the first number of omittable subsequent silence insertion descriptor frames within the same silence period may be considered to significantly degrade performance. The second number may be one, two, or three. Thus, after disabling of the first number of silence descriptor frames, one or a few silence descriptor frames may be transmitted to update background noise data. Also here, omission of a third number of subsequent frames after the second number of subsequent silence insertion descriptor frames within the silence period may be considered not to degrade performance significantly. The third number may be 3 to 7, preferably 4 to 6, preferably 5. Thus, after transmission of the second number of silence descriptor frames, the transmission of a few or a third number of subsequent silence descriptor frames may be disabled.

The omitting of data transmissions may be performed at an application of the telecommunication apparatus at which application the data transmissions emanate. The application may be a speech encoder.

The omitting of data transmissions may be performed at a data traffic stack layer arranged for transfer of user data of the telecommunication apparatus. The data traffic stack layer may be Packet Data Convergence Protocol.

According to a third aspect, there is provided a computer program comprising computer program code comprising instructions to cause a processor on which the computer program code is executed to perform the method according to the second aspect.

An advantage according to an embodiment of the invention is that it enables reduced transmission, which can reduce interference and/or power consumption.

DETAILED DESCRIPTION

Figure 1:
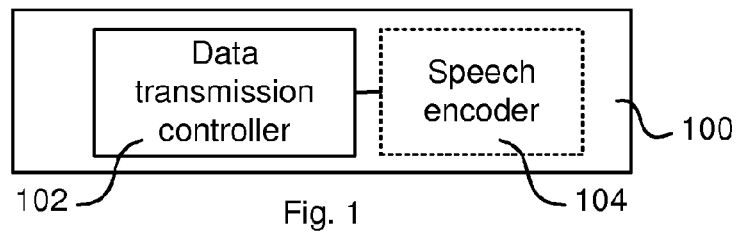
FIG. 1 is a block diagram schematically illustrating a telecommunication apparatus according to an embodiment.

FIG. 1 is a block diagram schematically illustrating a telecommunication apparatus 100 according to an embodiment. Not to obscure the features of the invention, inherent features of the telecommunication apparatus 100, such as antenna, transceiver, encoder, decoder, signal processor, possible user interface, etc., have been omitted in the illustration. The telecommunication apparatus 100 is for example a mobile phone, but may as well be a network node, a communication card in a personal computer, or other entity that operates in a communication system providing high-speed packet access. The telecommunication apparatus 100 is arranged to perform communication wirelessly, and arranged to operate according to both a reduced mode and a further reduced mode of transmission of dedicated physical control channel transmission, i.e. control information transmission, in addition to a normal mode of transmission of dedicated physical control channel transmission where dedicated physical control channel transmissions are performed in each slot. This is popularly called 'gating'. The telecommunication apparatus comprises a data transmission controller 102, which is arranged such that sporadic data transmissions, which are not absolutely necessary for proper operation of the telecommunication apparatus 100, its communication, or for the receiving party, are omitted. This has the result that not only the power consumption and the interference caused by the data transmissions are avoided; it has also the result that the telecommunication apparatus 100 may stay in the further reduced operation mode, which implies less power consumption and less interference caused by control signals which are triggered by the sporadic data transmission. Thus, the transmission controller 102 is arranged to determine if omission of a sporadic data transmission significantly will degrade performance, as elucidated above, of the telecommunication apparatus 100, its communication, or the receiving party. If the performance is not significantly degraded, the transmission controller 102 will disable transmission of the sporadic data transmission.

The sporadic data transmissions can for example emanate from a speech encoder 104, which during a silent period of the speech sends silence insertion descriptor (SID) frames, e.g. each 160 ms during the silent period. It has been noticed that the two first SID frames of a silent period are important for proper insertion of background noise at the receiving end, but if a few of the subsequent SID frames are lost, or intentionally omitted as suggested by the present approach, this does not affect the produced background noise at the receiving end. These omittable SID frames are thus not considered to significantly degrade performance if omitted. Thus, the data transmission controller can thus control the speech encoder 104 to omit these SID frames. Similar can be applied for other applications than speech transmissions where sporadic transmissions are produced by the application, e.g. in client-server applications providing any transmissions during wait periods. The data transmission controller preferably have knowledge of effects of omission of these sporadic data transmissions for the applications where the suggested approach is feasible, and can thus control the omission of data transmissions.

Figure 2:
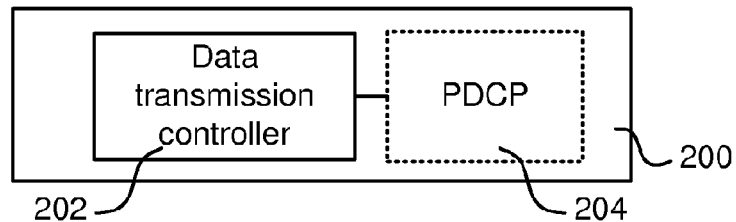
FIG. 2 is a block diagram schematically illustrating a telecommunication apparatus according to an embodiment.

FIG. 2 is a block diagram schematically illustrating a telecommunication apparatus 200 according to an embodiment. Similar as the telecommunication apparatus 100 of FIG. 1, the telecommunication apparatus 200 have commonly present features for such apparatuses, but not to obscure the particular features of the telecommunication apparatus 200, these are not illustrated and will not be discussed in detail. The telecommunication apparatus 200 comprises a data transmission controller 202, which has similar features as the data transmission controller 102 elucidated with reference to FIG. 1, but the data transmission controller 202 is arranged to control the omission of data transmissions by interacting with an entity responsible for packet data processing in some protocol layer, e.g. Packet Data Convergence Protol (PDCP), to avoid transmitting the omitted data transmissions instead of controlling the data generation of the application.

For the case of SID frame transmission, with respect to any of the embodiments demonstrated with reference to FIGS. 1 and 2, respectively, the first and second SID frame of a silence period are considered important for the proper function of background noise insertion, while a few of the subsequent SID frames, say 3, 4, 5, 6 or 7 of the subsequent SID frames, can be omitted without significant performance loss. After that, one or a few SID frames are beneficial to be sent to update background noise data, and after that, if the silence period remains, a further number of subsequent SID frames, say 3, 4, 5, 6 or 7 of the subsequent SID frames, can be omitted again. If the silence period still remains, one or a few SID frames are transmitted again, as elucidated above, and the process will continue.

The longer periods between transmitted data transmissions will thus enable the telecommunication apparatus 100, 200 to operate more in the further reduced operation mode, which will imply much less power consumption and interference in addition to the decreased power consumption and interference implied by the less intense data transmissions.

Figure 3:
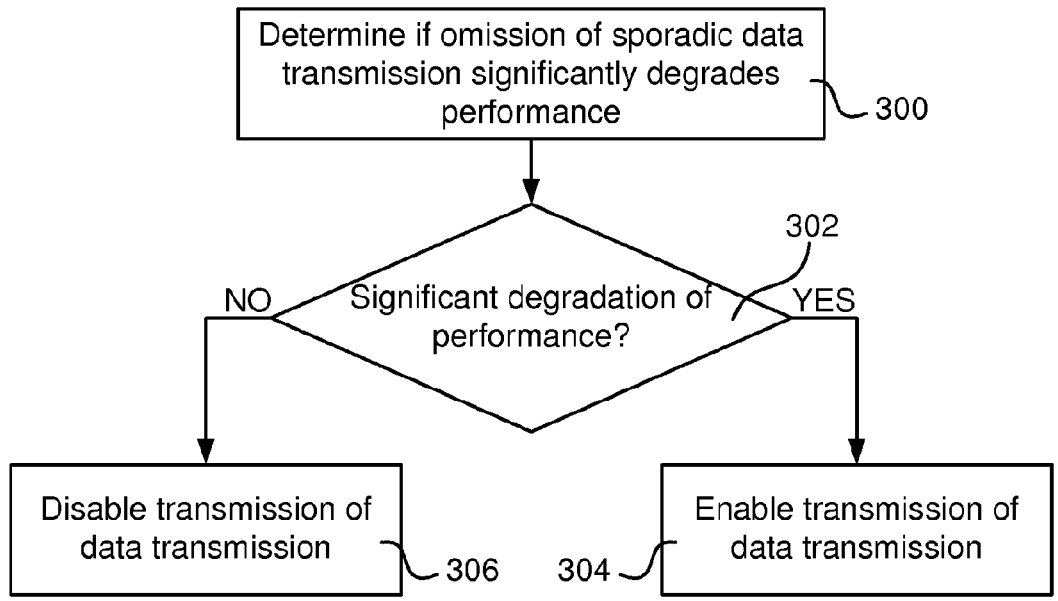
FIG. 3 is a flow chart schematically illustrating a method according to an embodiment.

FIG. 3 is a flow chart schematically illustrating a method according to an embodiment. In a data transmission determination step 300, it is determined whether omission of a sporadic data transmission significantly will degrade performance. In a decision step 302, the analysis of the data transmission is decided upon. If it is considered that a significant degradation of performance is at hand if omitting the data transmission, the data transmission is enabled in a data transmission enabling step 304. If no significant degradation of performance is at hand if omitting the data transmission, the data transmission is disabled in a data transmission disabling step 306. Optionally, in the decision step 302, there can also be a consideration whether gating is present, i.e. if there is a substantial gain in omitting the data transmission, where the data transmission disabling step 306 only is entered if gating is present and the data transmission is omittable. It is to be noted that the flow chart is for illustrative purposes for the understanding of the principle of selection of operation mode. In practice, the method is preferably performed in a real-time fashion, where the procedure moves through different states depending on occurrences and available data, and where actions can be made in parallel.

The sporadic data transmissions can for example emanate from a speech encoder, e.g. an adaptive multi-rate encoder, which during a silent period of the speech sends silence insertion descriptor (SID) frames, e.g. each 160 ms during the silent period. It has been noticed that the two first SID frames of a silent period are important for proper insertion of background noise at the receiving end, but if a few of the subsequent SID frames are lost, or intentionally omitted as suggested by the present approach, this does not affect the produced background noise at the receiving end. These omittable SID frames are thus not considered to significantly degrade performance if omitted. Thus, controlling the speech encoder to omit these SID frames can be feasible. Similar methodology also can be applied for other applications than speech transmissions where sporadic transmissions are produced by the application, e.g. in client-server applications providing any transmissions during wait periods. Preferably, knowledge of effects of omission of these sporadic data transmissions for the applications where the suggested approach is feasible, and can thus controlling the omission of data transmissions, can be handled by processing means, possibly in co-operation with database means holding the knowledge of the effects, e.g. in a look-up table.

For the case of SID frame transmission, the first and second SID frame of a silence period are considered important for the proper function of background noise insertion, while a few of the subsequent SID frames, say 3, 4, 5, 6 or 7 of the subsequent SID frames, can be omitted without significant performance loss. After that, one or a few SID frames are beneficial to be sent to update background noise data, and after that, if the silence period remains, a further number of subsequent SID frames, say 3, 4, 5, 6 or 7 of the subsequent SID frames, can be omitted. If the silence period still remains, one or a few SID frames are transmitted again, as elucidated above, and the process continues.

The longer periods between transmitted data transmissions will thus enable operation more in the further reduced operation mode, which will imply much less power consumption and interference in addition to the decreased power consumption and interference implied by the less intense data transmissions.

Figure 4:
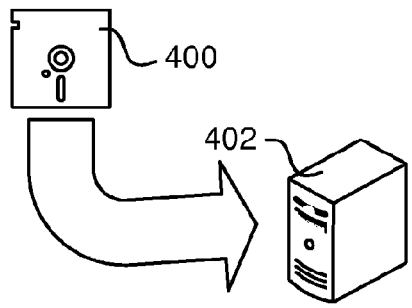
FIG. 4 schematically illustrates a computer readable medium according to an embodiment.

FIG. 4 schematically illustrates a computer readable medium 400 according to an embodiment. The embodiments of the method elucidated above are suitable for implementation with aid of processing means, such as computers and/or processors, as the operation of modern telecommunication apparatuses highly rely on computerized signal processing. Therefore, there is provided computer programs, comprising instructions arranged to cause the processing means, processor, or computer to perform the steps of any of the methods according to any of the embodiments described with reference to FIG. 3, in a telecommunication apparatus. The computer programs preferably comprise program code stored on a computer readable medium 400, as illustrated in FIG. 4, which can be loaded and executed by a processing means, processor, or computer 402 to cause it to perform the methods, respectively, according to the embodiments, preferably as any of the embodiments described with reference to FIG. 3. The computer 402 and computer program product 400 can be arranged to execute the program code sequentially where actions of the any of the methods are performed stepwise, but mostly be arranged to execute the program code on a real-time basis where actions of any of the methods are performed upon need and availability of data. The processing means, processor, or computer 402 is preferably what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

Figure 5:
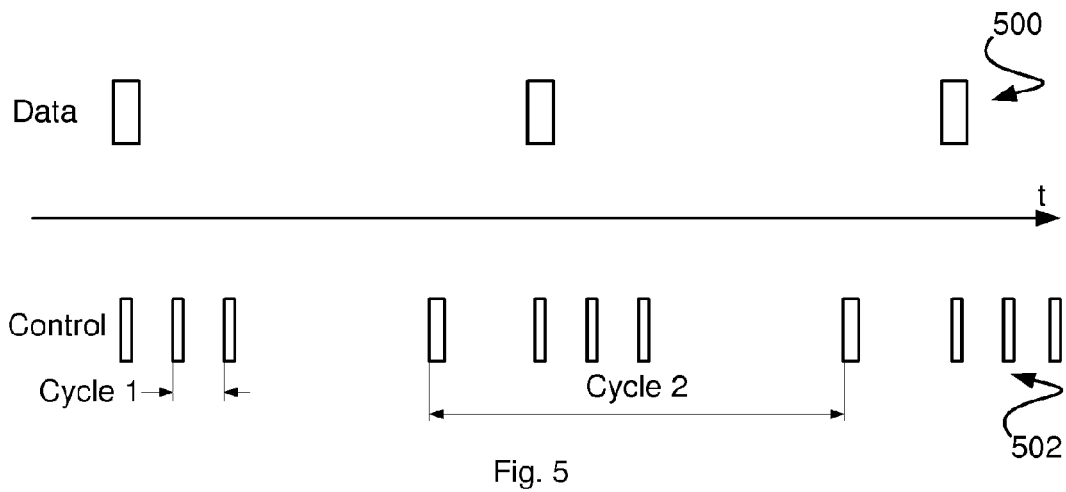
FIG. 5 is a signal scheme illustrating data transmissions and corresponding control transmissions according to prior art.
Figure 6:
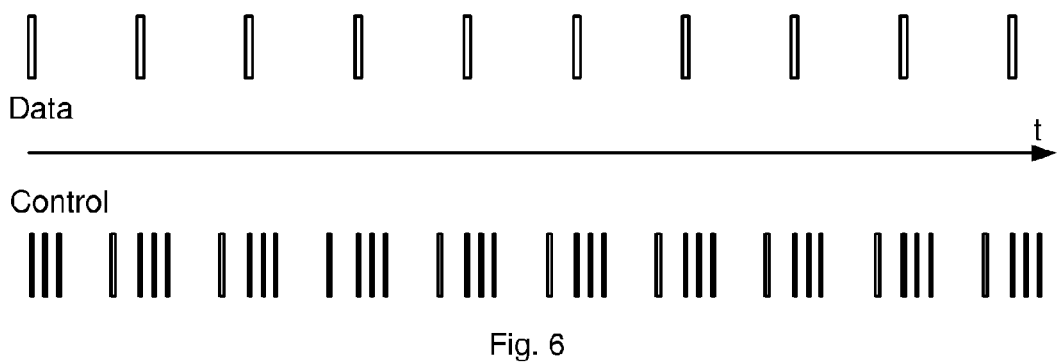
FIG. 6 is a signal scheme illustrating data transmissions and corresponding control transmissions according to prior art.
Figure 7:
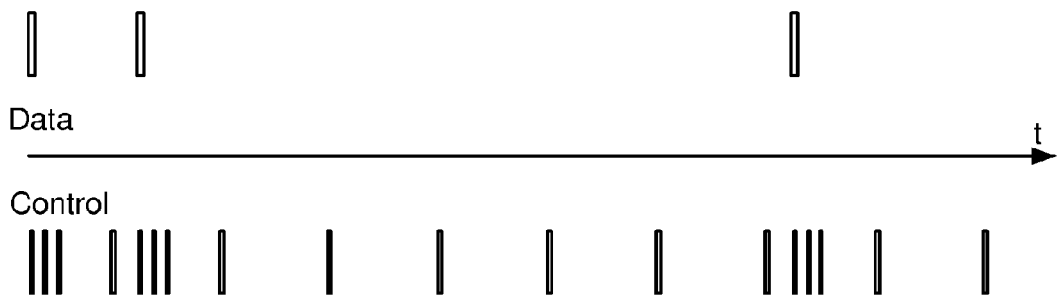
FIG. 7 is a signal scheme illustrating data transmissions and corresponding control transmissions according to an embodiment.

For the better understanding of the principles and effects of the above suggested approach, examples of data and control transmissions will be illustrated in and elucidated with reference to FIGS. 5 to 7.

FIG. 5 is a signal scheme illustrating data transmissions and corresponding control transmissions according to prior art. After a data transmission 500, control transmissions 502 are gated according to gating cycle 1, i.e. the reduced operation mode. Cycle 1 is used until an inactivity timer expires. Then a transition to gating cycle 2, i.e. the further reduced operation mode, is done. The communication apparatus remains in cycle 2 until the next data transmission occurs. Hence, the data transmission triggers a transition back to cycle 1. Typically, cycle 2 is configured to have much less intense control transmission activity. Further, in cycle 2, it is also possible to use a longer preamble than what is available in cycle 1. This long preamble is in many cases sufficient to allow power control to adjust before the data transmission. During cycle 1, the control transmission activity is more intense, wherein a shorter preamble suffices.

The reduced and the further reduced operation modes basically target different transmission scenarios, while continuous control transmission is used in other situations, such as during initial synchronizing. The reduced operation mode targets frequent data transmissions with short intervals. The further reduced operation mode targets applications with sporadic or large data volumes. For applications with periodic transmissions such as VoIP with AMR codec type, voice frames are encoded and transmitted once every 20 ms. The SID frames are transmitted once every 160 ms during silence periods. This means that reduced operation mode is efficient during VoIP transmissions while further reduced operation mode should be used as much as possible during silence periods. For other non-VoIP traffic such as file downloading and web surf, it is sufficient to rely only on the further reduced operation mode as the lower level of control transmission activity with its longer preambles.

FIG. 6 is a signal scheme illustrating data transmissions and corresponding control transmissions according to prior art very much similar as what is illustrated in FIG. 5, but where with another time scale to be able to better compare with FIG. 7, which is a signal scheme illustrating data transmissions and corresponding control transmissions according to an embodiment. In FIG. 7, it can be seen that after transmission of two data transmissions, a number of data transmissions are omitted. This implies that the control transmission scheme stays in the further reduced operation mode. After a few omitted data transmissions, a data transmission is enabled, which also triggers a transition to the reduced mode of operation for the control transmissions for a while, whereafter the operation mode changes again to the further reduced operation mode, where it is able to remain since a few further data transmissions are omitted.

Also by a visual comparison of the signal schemes of FIG. 6 and FIG. 7, it is easy to understand that both a significant amount of power is saved, and also that much less interference is introduced from the signals illustrated in the signal scheme of FIG. 7 compared to the prior art signal scheme of FIG. 6.

The invention claimed is:

1. A telecommunication apparatus enabled for high-speed packet access, the apparatus being arranged to operate according to a reduced and a further reduced mode of transmission of dedicated physical control channel transmission, the telecommunication apparatus comprising:
    a data transmission controller arranged to
        control sporadic data transmissions,
        determine whether an omission of a sporadic data transmission will significantly degrade performance, and
        disable transmission of that sporadic data transmission when it is determined that the omission will not significantly degrade performance,
    wherein the sporadic data transmissions include silence insertion descriptor frames transmitted in a silence period of a speech transmission,
    wherein the data transmission controller is arranged to
        determine that an omission of transmission of first and second silence insertion descriptor frames of the silence period will significantly degrade performance, and
        determine that an omission of transmission of a first number of silence insertion descriptor frames of the silence period will not significantly degrade performance, and
    wherein the first number of silence insertion descriptor frames are subsequent to the first and second silence insertion descriptor frames.

2. The telecommunication apparatus according to claim 1, wherein the data transmission controller is arranged to
    determine that an omission of transmission of a second number of silence insertion descriptor frames of the silence period will significantly degrade performance, and
    wherein the second number of silence insertion description frames are subsequent to the first number of silence insertion descriptor frames.

3. The telecommunication apparatus according to claim 2, wherein the second number is one, two, or three.

4. The telecommunication apparatus according to claim 2, wherein the data transmission controller is arranged to
    determine that an omission of transmission of a third number of silence insertion descriptor frames will not significantly degrade performance, and
    wherein the third number of silence insertion description frames are subsequent to the second number of silence insertion descriptor frames.

5. The telecommunication apparatus according to claim 4, wherein the third number is 3 to 7.

6. The telecommunication apparatus according to claim 1, wherein the first number is 3 to 7.

7. The telecommunication apparatus according to claim 1, wherein the data transmission controller is arranged to perform the omission of data transmissions at an application of the telecommunication apparatus at which application the data transmissions emanate.

8. The telecommunication apparatus according to claim 7, wherein the application is a speech encoder.

9. The telecommunication apparatus according to claim 1, wherein the data transmission controller is arranged to perform the omission of data transmissions at a data traffic stack layer arranged for transfer of user data of the telecommunication apparatus.

10. The telecommunication apparatus according to claim 9, wherein the data traffic stack layer is Packet Data Convergence Protocol.

11. A method of controlling sporadic data transmissions for a telecommunication apparatus enabled for high-speed packet access, the apparatus being arranged to operate according to a reduced and a further reduced mode of transmission of dedicated physical control channel transmission, the method comprising:
- determining whether an omission of a sporadic data transmission will significantly degrade performance; and
- disabling transmission of that sporadic data transmission when it is determined that the omission will not significantly degrade performance,
- wherein the sporadic data transmissions include silence insertion descriptor frames transmitted in a silence period of a speech transmission,
- wherein the step of determining whether the omission of the sporadic data transmission will significantly degrade performance comprises:
  - determining that an omission of transmission of first and second silence insertion descriptor frames of the silence period will significantly degrade performance, and
  - determining that an omission of transmission of a first number of silence insertion descriptor frames of the silence period will not significantly degrade performance, and
- wherein the first number of silence insertion descriptor frames are subsequent to the first and second silence insertion descriptor frames.

12. The method according to claim 11, wherein the step of determining whether the omission of the sporadic data transmission will significantly degrade performance further comprises:
- determining that an omission of transmission of a second number of silence insertion descriptor frames of the silence period will significantly degrade performance, and
- wherein the second number of silence insertion description frames are subsequent to the first number of silence insertion descriptor frames.

13. The method according to claim 12, wherein the second number is one, two, or three.

14. The method according to claim 12, wherein the step of determining whether the omission of the sporadic data transmission will significantly degrade performance further comprises:
- determining that an omission of transmission of a third number of silence insertion descriptor frames will not significantly degrade performance,
- wherein the third number of silence insertion description frames are subsequent to the second number of silence insertion descriptor frames.

15. The method according to claim 14, wherein the third number is 3 to 7.

16. The method according to claim 11, wherein the first number is 3 to 7.

17. The method according to claim 11, wherein omitting of data transmissions is performed at an application of the telecommunication apparatus at which application the data transmissions emanate.

18. The method according to claim 17, wherein the application is a speech encoder.

19. The method according to claim 11, wherein omitting of data transmissions is performed at a data traffic stack layer arranged for transfer of user data of the telecommunication apparatus.

20. The method according to claim 19, wherein the data traffic stack layer is Packet Data Convergence Protocol.

21. A non-transitory computer readable medium containing therein a computer program comprising computer program code comprising instructions to cause a processor on which the computer program code is executed to perform the method according to claim 11.

* * * * *

UNITED STATES PATENT AND TRADEMARK OFFICE
CERTIFICATE OF CORRECTION

PATENT NO.        : 8,913,512 B2
APPLICATION NO.   : 13/120506
DATED             : December 16, 2014
INVENTOR(S)       : Hannu et al.

It is certified that error appears in the above-identified patent and that said Letters Patent is hereby corrected as shown below:

In the Specification

In Column 5, Line 29, delete "Protol" and insert -- Protocol --, therefor.

Signed and Sealed this
Seventh Day of July, 2015

Michelle K. Lee
*Director of the United States Patent and Trademark Office*